July 19, 1949.   E. J. JOHANSSON   2,476,874
QUICK-GRIP CHUCK
Filed June 27, 1945   2 Sheets-Sheet 1
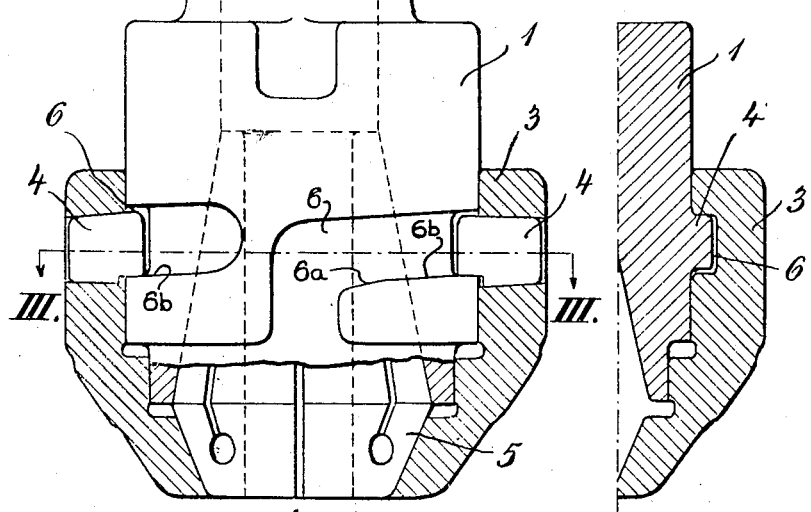
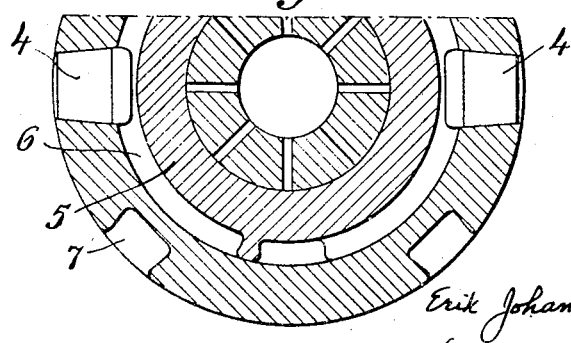
Inventor:
Erik Johannes Johansson,
by
Pierce & Scheffler,
Attorneys.

July 19, 1949.  E. J. JOHANSSON  2,476,874
QUICK-GRIP CHUCK
Filed June 27, 1945  2 Sheets-Sheet 2
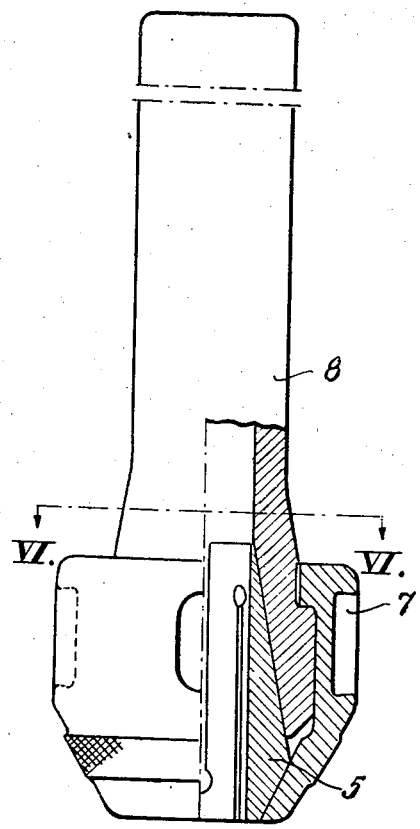
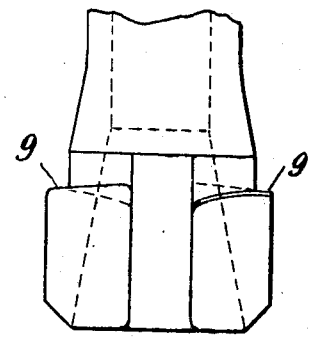
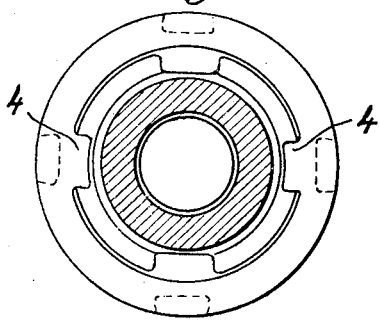
Inventor:
Erik Johannes Johansson,
by Pierce & Scheffler,
Attorneys.

Patented July 19, 1949

2,476,874

UNITED STATES PATENT OFFICE 2,476,874

QUICK GRIP CHUCK

Erik Johannes Johansson, Bengtsbo,
Brickegarden, Karlskoga, Sweden

Application June 27, 1945, Serial No. 601,821
In Sweden June 27, 1944

2 Claims. (Cl. 279—49)

This invention relates to a quick-grip-chuck adapted to hold a work piece or a tool in rotary machine tools such as drilling machines, milling machines, automatic lathes, other turning machines etc.

It is an object of the invention to provide improved means for quick exchange of tools or work pieces on avoiding the use of ordinary threaded nuts which necessitate unscrewing and screwing on a screw nut when exchanging a collet.

In the accompanying drawings which form part of this specification, and in which like characters of reference indicate the same or equivalent parts:

Fig. 1 is an elevational view, partly in section, of the improved chuck with jamb nut;

Fig. 2 is a longitudinal sectional view of a portion of the body and jamb nut of a modified embodiment of the chuck;

Fig. 3 is a fragmentary cross sectional view on the line III—III in Fig. 1;

Fig. 4 is an elevational view, partly in section, of still another embodiment of the invention;

Fig. 5 is an elevational view of the body of the chuck shown in Fig. 4;

Fig. 6 is a cross sectional view on the line VI—VI of Fig. 4 and

Fig. 7 is an end view of the shank and body of the chuck as shown in Figs. 4 and 5.

Referring to Figs. 1 and 3 of the drawings, the chuck has a collet 5 into which the tool or the work piece is to be fitted whereafter the collet is inserted into the body I of the chuck into the taper bore of which the collet is adapted to fit closely. The jamb nut 3 is sleeved onto the body I of the chuck and the collet 5 whereafter it is turned so that its latch lugs 4 slide in spiral grooves 6 in the body I of the chuck. Thereby the lugs 4 pull the nut 3 against the tapered bottom end of the collet 5. The grooves 6 are generally of bayonet slot form with entrance openings extending axially of the chuck body I and spiral portions having a pitch which decreases from the entrance openings. As shown in Fig. 1, the initial section 6a of the lower shoulder of groove 6 has a relatively sharp pitch to effect a quick seating of the collet 5 in the tapered bore of the chuck body I upon a relatively small rotation of the jamb nut 3 with respect to the chuck body I. The remaining section 6b of the lower shoulder of groove 6 has a relatively small pitch, and the progressive displacement of a lug 4 along this section of the groove forces the collet upwardly in the tapered bore and thereby develops heavy compression stresses, exerted radially of the collet, which effectively lock the collet upon the tool and to the chuck body. The small pitch of the inner section 6b of groove 6 provides a self-locking construction as the pressure between a latch lug 4 and the groove shoulder 6b has only a negligible component parallel to the shoulder 6b. In order to still more tighten and lock the chuck the nut 3 is provided with recesses 7 of the claw hook of a spanner.

In the embodiment shown in Fig. 2 the spiral grooves 6 are provided in the nut 3 whereas the body I of the chuck is equipped with the latch lugs 4. While this arrangement constitutes an inversion of that shown in Figs. 1 and 3 its construction is fundamentally the same as the latter.

Also the construction shown in Figs. 4 to 7 is equivalent to those illustrated in Figs. 1 to 3. In this modified embodiment relating to a relatively small chuck the spiral grooves are replaced by spiral guide shoulders 9 of progressively decreasing pitch for the lugs 4 at the upper end of the body I of the chuck.

In each of the illustrated embodiments of the invention, the entrance and exit ends of the axially extending portions of the guide grooves are rounded off in conventional manner, thereby facilitating the assembly of the jam nut on the body of the chuck and the introduction of the guide lugs 4 into the spiral portions of the grooves.

I claim:

1. A tool holding chuck comprising a chuck body member having at one end a tapered bore, a conical longitudinally slotted collet disposed in said bore for gripping the tool, a jamb nut member rotatably mounted on said chuck body member and which includes a tapered interior surface seated against a complementary exteriorly tapered surface on said collet, and cooperating lug and spiral shoulder portions on said chuck body and nut members for effecting relative axial displacement therebetween upon relative angular displacement thereof, the member having said shoulder including a longitudinally extending groove merging into the entrance edge of the shoulder, a substantial portion of said shoulder as measured from the entrance edge thereof having a relatively sharp pitch to thereby effect a rapid and substantial initial combined axial and radially inward displacement of said collet upon initial angular displacement between said chuck body and nut members, and the remainder of said shoulder having a relatively small pitch to thereby enable development of heavy radially inward pressure by said collet upon the tool and effectively lock said lug against inadvertent displacement on said shoulder.

2. A tool holding chuck as defined in claim 1 wherein the pitch of said spiral shoulder progressively decreases from the entrance edge thereof.

ERIK JOHANNES JOHANSSON.

REFERENCES CITED

The following references are of record in the file of this patent:

UNITED STATES PATENTS

| Number | Name | Date |
|---|---|---|
| 25,283 | Smith | Aug. 30, 1859 |
| 493,231 | Muir | Mar. 7, 1893 |
| 870,142 | Wahlstrom | Nov. 5, 1907 |
| 1,369,632 | Diel | Feb. 22, 1921 |
| 1,372,482 | Clare | Feb. 22, 1921 |
| 1,863,108 | Glenzer | June 14, 1932 |

FOREIGN PATENTS

| Number | Country | Date |
|---|---|---|
| 96,151 | Sweden | July 4, 1939 |
| 16,392 | Great Britain | Sept. 17, 1892 |
| 34,404 | Switzerland | June 30, 1905 |
| 96,151 | Germany | July 4, 1939 |
| 465,128 | Great Britain | May 3, 1937 |
| 44,293 | Sweden | May 30, 1917 |